United States Patent [19]

Tacke

[11] Patent Number: 4,569,984
[45] Date of Patent: Feb. 11, 1986

[54] INTERPHASE PROCESS FOR THE PRODUCTION OF FULLY AROMATIC POLYESTER CARBONATE FROM ALKALI SALT OF AROMATIC DICARBOXYLIC ACID AND BIS-CHLOROCARBONIC ESTER OF DIPHENOL

[75] Inventor: Peter Tacke, Krefeld, Fed. Rep. of Germany

[73] Assignee: Bayer Aktiengesellschaft, Leverkusen, Fed. Rep. of Germany

[21] Appl. No.: 648,667

[22] Filed: Sep. 10, 1984

[30] Foreign Application Priority Data

Sep. 20, 1983 [DE] Fed. Rep. of Germany ....... 3333863

[51] Int. Cl.⁴ ............................................ C08G 63/62
[52] U.S. Cl. .................................... 528/271; 528/176
[58] Field of Search ................................. 528/271, 176

[56] References Cited

U.S. PATENT DOCUMENTS 3,220,976 11/1965 Goldberg ............................. 528/271
4,130,548 12/1978 Kochanowski ..................... 528/176

Primary Examiner—Harold D. Anderson
Attorney, Agent, or Firm—Connolly and Hutz

[57] ABSTRACT

Aromatic polyester carbonates may be produced by the interphase process by reacting salts of aromatic dicarboxylic acids with excess bis-chlorocarbonic esters of diphenol at a pH value of from 6 to 8.5 and by subsequently polycondensing the product at a pH value of from 9 to 14.

9 Claims, No Drawings

INTERPHASE PROCESS FOR THE PRODUCTION OF FULLY AROMATIC POLYESTER CARBONATE FROM ALKALI SALT OF AROMATIC DICARBOXYLIC ACID AND BIS-CHLOROCARBONIC ESTER OF DIPHENOL

The present invention relates to an interphase process for the production of fully aromatic polyester carbonates according to which bis-chlorocarbonic esters of diphenols are reacted with alkali salts of aromatic dicarboxylic acids.

Aromatic polyester carbonates are known. They combine the advantageous properties of aromatic polyesters and aromatic polycarbonates. There are various processes available for the production of aromatic polyester carbonates:

The melt transesterification process which is described in DE-AS No. 2,074,315 suffers from the disadvantage that the resulting products are not colourless.

DE-OS No. 2,758,030 concerns the production of aromatic polyester carbonates by reacting phosgene with aromatic dicarboxylic acids and bisphenols by the interphase process in the presence of a tertiary amine and an inorganic base. Our examinations have shown that under the given conditions a large amount of the dicarboxylic acid which is used does not react. For this reason the process is not profitable.

The published European patent application No. 10 840 relates to an interphase process and a solution process respectively for the production of polyester carbonates. The acid dichlorides which are required constitute, however, very expensive starting substances.

U.S. Pat. No. 3,220,976 describes the reaction of bis-chlorocarbonic esters of diphenols with aromatic dicarboxylic acids in tertiary amines as solvent and acid acceptors. This process is, however, involved and the quantitative separation of the tertiary amines is difficult.

U.S. Pat. No. 4,130,548 relates to an interphase process for the production of aromatic polyester carbonates: in the first stage the bis-chlorocarbonic esters of a bisphenol are reacted with a nearly equimolar quantity of alkali salts of aromatic dicarboxylic acids to produce polyester anhydride; in a second stage this polyester anhydride is reacted with at least a molar equivalent quantity of bisphenol and in the third stage the excess of bisphenol is polycondensed with the product of the second stage to produce polyester carbonate. If an excess of bisphenol is not used in the second stage, the third stage then of course becomes redundant; this means that the end of the reaction becomes considerably drawn out. A three-stage process is however involved and is more expensive.

In contrast it has rather surprisingly been found that aromatic polyester carbonates may be obtained in a substantially more straightforward and quicker manner if excess bisphenol chlorocarbonic esters are reacted with salts of aromatic dicarboxylic acids at a pH value of from 6 to 8.5, preferably at elevated temperature and then subsequently reacted at a pH value of from 9 to 14. Further bis-chlorocarbonic esters, chain terminators and branching agents may optionally be added during this subsequent reaction. In this manner the total amount of dicarboxylic acid which is used can be reacted.

Accordingly, the present invention provides an interphase for the production of aromatic polyester carbonates by the interphase process, characterised in that in a first stage at least one alkali salt of an aromatic dicarboxylic acid is reacted with an excess of from 11 to 300, preferably from 15 to 30 mol % of bis-chlorocarbonic ester of at least one diphenol at a temperature ranging from 25 to 100 and preferably from 35° to 55° C. and at a pH value ranging from 6 to 8.5 and preferably from 7 to 8.5, and in a second stage the reaction mixture is polycondensed at a temperature of from 10 to 60 and preferably from 20° to 40° C., optionally with addition of chain-terminators, branching agents and/or further bis-chlorocarbonic esters at a pH value of from 9 to 14.

Preferred aromatic dicarboxylic acids are iso- and tere-phthalic acid. According to one preferred embodiment they are used in a ratio of from 7:3 to 3:7. Preferred alkali salts are potassium salts and in particular sodium salts.

Bis-chlorocarbonic esters of bisphenols are known. They may be produced, by way of example, according to DE-OS Nos. 2,410,668 or 2,410,743.

Preferred diphenols are, for example, diphenols such as are described in DE-OS No. 3,007,934. Diphenols which are particularly preferred are bisphenol-A, tetramethyl bisphenol-A, 1,1-bis-(4-hydroxyphenyl)-isobutane and -cyclohexane, 4,4'-dihydroxydiphenyl sulphide and -sulphone and the di- and tetra-halogenated derivatives thereof.

Preferred branching agents are also described in DE-OS No. 3,007,934.

Preferred chain terminators for limiting the molecular weight are aliphatic and aromatic monocarboxylic acids and monophenols, chlorocarbonic esters of monophenols and acid chlorides of aromatic monocarboxylic acids. The aromatic rings of the chain terminators may carry up to 2 branched and/or unbranched alkyl substituents, each of which having from 1 to 18 carbon atoms. The chain terminators may be used in a quantity of from 1 to 10 and preferably from 2 to 6 mol %, based on bis-chlorocarbonic ester which is used.

The interphase process may be carried out, for example, as is described in DE-OS No. 3,007,934. The process may be carried out continuously or discontinuously. Tertiary amines and quartary ammonium salts act as catalysts.

The polyester carbonates which are produced according to the present process may contain up to 0.5 mol %, based on the sum of ester and carbonate groups, of anhydride groups.

The carbonate group content is determined essentially by the ratio of aromatic dicarboxylic acids/bis-chlorocarbonic esters and is generally from 10 to 80 mol %, based on the sum of ester and carbonate groups.

The polyester carbonates which are produced according to the present process may be processed according to conventional processes in injection moulding machines to produce mouldings or in extruders to produce semi-finished products, optionally after addition of stabilisers, flowing agents, plasticisers, mould-release agents, fillers and reinforcers, such as glass fibres, glass balls, asbestos and carbon fibres, kieselguhr, kaolin, powdered minerals and pigments. The polyester carbonates which are produced according to the present invention are, moreover, suitable for alloying with other polycondensates, polymers and polyaddition compounds.

EXAMPLES

Example 1

A solution consisting of
16.6 g (0.1 mol) of both iso- and tere-phthalic acid,
8.4 g of sodium hydrogen carbonate,
15.2 g (0.38 mols) of sodium hydroxide,
1 ml of N-ethyl-piperidine in
2 l of water
is introduced into a 3-necked flask which has a stirrer a dropping funnel and a reflux cooler and a solution of
85 g (0.24 mols) of bisphenol-A-bis-chlorocarbonic ester in
1.2 l of dichloromethane is added.

With vigorous stirring the solution is rapidly heated to 40° C. and the pH value of the aqueous phase is maintained at from 7.6 to 8.3 by the addition of 10% by weight sodium lye.

After about 50 minutes the aromatic dicarboxylic acids are completely reacted.

After cooling to about 20° to 25° C., 7 g (about 0.02 mols) of bisphenol-A-bis-chlorocarbonic ester and 1.1 g (about 7 mols) of tert. butylphenol are added and subsequently stirred over a period of 30 minutes at a pH value of about 13.

The phases are separated, the organic phase is washed and subsequently heavily concentrated. A casting film is produced from the concentrated solution and this is freed of any remaining dichloromethane at 100° C. under vacuum (about 10 mbars).

The completely colourless polyester carbonate which is obtained (with about a 77 mol % quantity of carbon ester) has a relative viscosity of 1,261 (measured with a solution of 0.25 g of the product in 50 ml of dichloromethane solution at 25° C.).

The carboxylic acid anhydride content is 0.273 mol % (based on the sum of ester and carbonate groups).

Example 2

As in Example 1,
21.6 g (0.13 mols) of iso-phthalic acid,
6 g of sodium hydrogen carbonate,
9.6 g (0.24 mols) of sodium hydroxide and
1 ml of triethylamine are dissolved in
2 l of water and a solution of
85 g (0.24 mols) of bisphenol-A-bis-chlorocarbonic ester in
1.2 l of dichloromethane are added.

The process is continued as in Example 1.

The completely colourless product which is obtained has a relative viscosity of 1,258 (measured as in Example 1). The carboxylic acid anhydride content is 0.238 mol %.

Example 3

As in Example 1
12 g (0.072 mols) of tere-phthalic acid,
5 g of sodium hydrogen carbonate,
5.6 g (0.14 mols) of sodium hydroxide and
0.5 g of tetrabutylammonium chloride are dissolved in
2 l of water and a solution of
85 g (0.24 mols) of bisphenol-A-bis-chlorocarbonic ester in
1.2 l of dichloromethane is added.

The process is continued as in Example 1 except that no further bisphenol chlorocarbonic ester is used.

The completely colourless product has a relative viscosity of 1.246.

The carboxylic acid anhydride content is 0.182 mol %.

I claim:

1. A process for the production of aromatic polyester carbonate by the interphase process, comprising
   (a) in a first stage each mol of at least one alkali salt of an aromatic dicarboxylic acid is reacted with from 1.11 to 4 mol of bis-chlorocarbonic ester of at least one diphenol at a temperature ranging from 25° to 100° C. and at a pH value of from 6 to 8.5 and
   (b) in a second stage the reaction mixture from (a) is polycondensed at a temperature ranging from 10° to 60° C. at a pH value of from 9 to 14.

2. A process according to claim 1 wherein the second stage is carried out at a temperature ranging from 20° to 40° C.

3. A process according to claim 1 wherein the first stage of the process is carried out at a temperature ranging from 35° to 55° C.

4. A process according to claim 3 wherein the first stage is carried out at a pH value ranging from 7 to 8.5.

5. A process according to claim 1 wherein the first stage is carried out at a pH value ranging from 7 to 8.5.

6. A process according to claim 1 wherein the first stage has from 1.15 to 1.30 mol of bis-chlorocarbonic ester as reactant.

7. A process according to claim 6 wherein the first stage of the process is carried out at a temperature ranging from 35° to 55° C.

8. A process according to claim 6 wherein the first stage is carried out at a pH value ranging from 7 to 8.5.

9. A process according to claim 1 wherein the polycondensation in step (b) is in the presence of a chain terminator, branching agent, additional bis-chlorocarbonic ester or a mixture thereof.

* * * * *